(12) United States Patent
Shan et al.

(10) Patent No.: US 9,225,399 B2
(45) Date of Patent: Dec. 29, 2015

(54) METHOD TO ENABLE OPTIMIZATION FOR SMALL DATA IN AN EVOLVED PACKET CORE (EPC)

(71) Applicants: Chang Hong Shan, Shanghai (CN); Puneet Jain, Hillsboro, OR (US)

(72) Inventors: Chang Hong Shan, Shanghai (CN); Puneet Jain, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/126,611

(22) PCT Filed: Oct. 28, 2013

(86) PCT No.: PCT/US2013/067043
§ 371 (c)(1),
(2) Date: Dec. 16, 2013

(87) PCT Pub. No.: WO2014/070649
PCT Pub. Date: May 8, 2014

(65) Prior Publication Data
US 2014/0269779 A1  Sep. 18, 2014

Related U.S. Application Data

(60) Provisional application No. 61/721,436, filed on Nov. 1, 2012.

(51) Int. Cl.
*H04B 7/04* (2006.01)
*H04W 28/24* (2009.01)
(Continued)

(52) U.S. Cl.
CPC ............ *H04B 7/0417* (2013.01); *H04B 7/0452* (2013.01); *H04B 7/0626* (2013.01);
(Continued)

(58) Field of Classification Search
CPC .................................. H04W 52/0216–52/0222
See application file for complete search history.

(56) References Cited

U.S. PATENT DOCUMENTS 8,072,963 B2   12/2011   Suzuki
8,150,477 B2   4/2012   Cho et al.
(Continued)

FOREIGN PATENT DOCUMENTS

EP   2154918 A1   2/2010
EP   2369883 A1   9/2011
(Continued)

OTHER PUBLICATIONS

"3GPP MTC Standard TTA M2M Seminar"—ETRI Standards Research Center, Oct. 23, 2012, edu.tta.or.kr/sub3/down.php?No=123&file=M2M_1-4.pdf.*
(Continued)

*Primary Examiner* — Xavier S. Wong
(74) *Attorney, Agent, or Firm* — Schwegman Lundberg & Woessner, P.A.

(57) ABSTRACT

Embodiments of a system and method for providing small data and device triggering enhancement (SDDTE) are generally described herein. In some embodiments, memory is provided for storing an SDDTE optimization container therein. A processor is coupled to the memory and is arranged to analyze an SDDTE optimization container including parameters provided therein and to perform SDDTE optimization based on the parameters. The parameters provided by the SDDTE optimization container include an SDDTE optimization timer, wherein the processor holds in the memory small data messages received during a time frame set by the SDDTE optimization timer upon receipt of a first small data message.

22 Claims, 10 Drawing Sheets

(51) Int. Cl.

| | | |
|---|---|---|
| *H04W 52/02* | (2009.01) | |
| *H04W 24/08* | (2009.01) | |
| *H04J 3/06* | (2006.01) | |
| *H04L 5/00* | (2006.01) | |
| *H04W 16/24* | (2009.01) | |
| *H04W 8/00* | (2009.01) | |
| *H04W 72/04* | (2009.01) | |
| *H04W 76/02* | (2009.01) | |
| *H04B 7/06* | (2006.01) | |

(52) U.S. Cl.
CPC ............ *H04J3/0614* (2013.01); *H04L 5/0046* (2013.01); *H04L 5/0048* (2013.01); *H04W 8/005* (2013.01); *H04W 16/24* (2013.01); *H04W 24/08* (2013.01); *H04W 28/24* (2013.01); *H04W 52/0216* (2013.01); *H04W 72/042* (2013.01); *H04W 76/023* (2013.01); *Y02B 60/50* (2013.01)

(56) References Cited

U.S. PATENT DOCUMENTS

| | | | |
|---|---|---|---|
| 8,681,627 | B2 | 3/2014 | Choudhury et al. |
| 8,885,458 | B2* | 11/2014 | Diachina et al. ............. 370/216 |
| 9,100,160 | B2* | 8/2015 | Martinez Tarradell et al. ....... 1/1 |
| 2001/0051994 | A1* | 12/2001 | Serizawa et al. ............. 709/211 |
| 2004/0208183 | A1 | 10/2004 | Balachandran et al. |
| 2005/0026616 | A1 | 2/2005 | Cavalli et al. |
| 2005/0124372 | A1 | 6/2005 | Lundby et al. |
| 2006/0058033 | A1 | 3/2006 | Marsan et al. |
| 2007/0111747 | A1 | 5/2007 | Lundby et al. |
| 2007/0298725 | A1 | 12/2007 | Ryu |
| 2008/0188247 | A1 | 8/2008 | Worrall |
| 2009/0268624 | A1 | 10/2009 | Imamura et al. |
| 2010/0074109 | A1 | 3/2010 | Klingenbrunn et al. |
| 2010/0097937 | A1 | 4/2010 | Pietraski et al. |
| 2010/0278038 | A1 | 11/2010 | Stahle et al. |
| 2011/0038326 | A1 | 2/2011 | Davies et al. |
| 2011/0059744 | A1 | 3/2011 | Won et al. |
| 2011/0110347 | A1 | 5/2011 | Mun |
| 2011/0149728 | A1 | 6/2011 | Lee |
| 2011/0190000 | A1 | 8/2011 | Kwun |
| 2011/0244877 | A1 | 10/2011 | Farajidana et al. |
| 2011/0310769 | A1 | 12/2011 | Lee et al. |
| 2011/0319065 | A1 | 12/2011 | Dalsgaard et al. |
| 2012/0083283 | A1 | 4/2012 | Phan et al. |
| 2012/0113844 | A1 | 5/2012 | Krishnamurthy |
| 2012/0155406 | A1 | 6/2012 | Kim et al. |
| 2012/0207105 | A1 | 8/2012 | Geirhofer et al. |
| 2012/0213057 | A1 | 8/2012 | Zhang et al. |
| 2012/0213137 | A1 | 8/2012 | Jeong et al. |
| 2012/0218913 | A1 | 8/2012 | Park et al. |
| 2012/0220286 | A1 | 8/2012 | Chen et al. |
| 2012/0230290 | A1 | 9/2012 | Seo et al. |
| 2012/0252518 | A1 | 10/2012 | Karampatsis et al. |
| 2012/0264483 | A1 | 10/2012 | Chin et al. |
| 2013/0051277 | A1 | 2/2013 | Hakola et al. |
| 2013/0080597 | A1* | 3/2013 | Liao ............. 709/219 |
| 2013/0258874 | A1 | 10/2013 | Khoshnevis et al. |
| 2013/0303206 | A1* | 11/2013 | Starsinic et al. ............. 455/466 |
| 2014/0016614 | A1* | 1/2014 | Velev et al. ................... 370/331 |
| 2014/0036795 | A1* | 2/2014 | Martinez Tarradell et al. ............. 370/329 |
| 2014/0086174 | A1 | 3/2014 | Nam et al. |
| 2014/0113667 | A1* | 4/2014 | Keller et al. ................. 455/466 |
| 2014/0269383 | A1 | 9/2014 | He et al. |
| 2014/0286215 | A1 | 9/2014 | Koc et al. |
| 2014/0286302 | A1 | 9/2014 | Khoryaev et al. |
| 2014/0295856 | A1 | 10/2014 | Chou et al. |

FOREIGN PATENT DOCUMENTS

| | | |
|---|---|---|
| KR | 1020090093758 A | 9/2009 |
| KR | 1020110011145 A | 2/2011 |
| KR | 1020120033283 A | 4/2012 |
| KR | 1020120094369 A | 8/2012 |
| KR | 1020120096408 A | 8/2012 |
| WO | WO-0251189 A1 | 6/2002 |
| WO | WO-2004045083 A2 | 5/2004 |
| WO | WO-2004114683 A2 | 12/2004 |
| WO | WO-2011105726 A2 | 9/2011 |
| WO | WO-2011149533 A1 | 12/2011 |
| WO | WO-2012065033 A1 | 5/2012 |
| WO | WO-2012109989 A1 | 8/2012 |
| WO | WO-2012111937 A2 | 8/2012 |
| WO | WO-2012112281 A2 | 8/2012 |
| WO | WO-2012121757 A1 | 9/2012 |
| WO | WO-2012134579 A1 | 10/2012 |
| WO | WO-2012141884 A1 | 10/2012 |
| WO | WO-2013064385 A1 | 5/2013 |
| WO | WO-2014/070410 A1 | 5/2014 |
| WO | WO-2014070321 A1 | 5/2014 |
| WO | WO-2014070347 A1 | 5/2014 |
| WO | WO-2014070359 A1 | 5/2014 |
| WO | WO-2014070411 A1 | 5/2014 |
| WO | WO-2014070480 A1 | 5/2014 |
| WO | WO-2014070602 A1 | 5/2014 |
| WO | WO-2014070649 A1 | 5/2014 |
| WO | WO-2014070768 A1 | 5/2014 |
| WO | WO-2014070778 A1 | 5/2014 |
| WO | WO-2014070901 A1 | 5/2014 |
| WO | WO-2014070929 A1 | 5/2014 |
| WO | WO-2014070933 A1 | 5/2014 |

OTHER PUBLICATIONS

"The Mobile Broadband Standard"—3GPP List of Work Items, http://www.3gpp.org/DynaReport/WI-List.html.*

"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.

"Evolved Universal Terrestrial Radio Access (E-UTRA); Radio Resource Control (RRC);", 3GPP TS 36.331 V11.1.0 (Sep. 2012) Technical Specification Group Radio Access Network; Protocol specification (Release 11), (Sep. 2012), 325 pgs.

"Evolved Universal Terrestrial Radio Access (E-UTRA); Study on signalling and procedure for interference avoidance for in-device coexistence", 3GPP TR 36.816 V11.1.0 (Sep. 2011) Technical Specification Group Radio Access Network (Release 11), (Sep. 2011), 44 pgs.

"Inter-RAT mobility for UE under IDC interference", 3GPP TSG-RAN WG2 #79bis; R2-124725; Agenda Item 7.6.3; LG Electronics Inc., (Oct. 8, 2012), 1 pg.

"Inter-RAT operation for in-device coexistence", 3GPP TSG RAN WG2 Meeting #80; R2-125750; Agenda Item 7.6.1; Intel Corporation, (Nov. 12, 2012), 2 pgs.

"International Application Serial No. PCT/US2013/067582, International Search Report mailed Nov. 27, 2013", 3 pgs.

"International Application Serial No. PCT/US2013/067582, Written Opinion mailed Nov. 27, 2013", 4 pgs.

"Title Change Request", 3GPP TSG-RAN WG2 Meeting #79bis; R2-125108, (Oct. 8, 2012), 5 pgs.

Hong, Wei, et al., "Considering In-Device Coexistence interference from WiFi point of view", IEEE 802.11-13/0880-00, (Jul. 17, 2013), 13 pgs.

"3GPP TSG-SA5 Meeting #86 Change Request 32.762", New Orleans. S5-123029., (Nov. 12, 2012), 14 pgs.

"U.S. Appl. No. 14/119,228, Preliminary Amendment filed Nov. 21, 2013", 9 pgs.

"U.S. Appl. No. 14/124,457, Preliminary Amendment filed Dec. 6, 2013", 7 pgs.

"U.S. Appl. No. 14/124,939, Preliminary Amendment filed Dec. 9, 2013", 9 pgs.

(56) References Cited

OTHER PUBLICATIONS

"U.S. Appl. No. 14/124,964, Preliminary Amendment filed Dec. 9, 2013", 9 pgs.
"U.S. Appl. No. 14/125,472, Preliminary Amendment filed Dec. 11, 2013", 9 pgs.
"U.S. Appl. No. 14/125,767, Preliminary Amendment filed Dec. 12, 2013", 11 pgs.
"U.S. Appl. No. 14/126,654, Preliminary Amendment filed Dec. 16, 2013", 10 pgs.
"U.S. Appl. No. 14/126,998, Preliminary Amendment filed Dec. 17, 2013", 8 pgs.
"U.S. Appl. No. 14/127,015, Preliminary Amendment filed Dec. 17, 2013", 8 pgs.
"U.S. Appl. No. 14/127,092, Preliminary Amendment filed Dec. 17, 2013", 10 pgs.
"U.S. Appl. No. 14/127,621, Preliminary Amendment filed Dec. 19, 2013", 8 pgs.
"CSI Collision Handling for CoMP", R1-123468, 3GPP TSG RAN WG1 #70, Samsung, (Aug. 2012), 3 pgs.
"Discussion on reduction of CSI processing complexity to support CoMP", R1-124368, 3GPP TSG RAN WG1 #70bis, Samsung, (Oct. 2012), 4 pgs.
"Evaluation of MTC Device triggering", HTC, TD S2-110732, 3GPP TSG SA WG2 Meeting #83, (Feb. 2011), 2 pgs.
"International Application Serial No. PCT/US2013/060146, International Search Report mailed Dec. 27, 2013", 5 pgs.
"International Application Serial No. PCT/US2013/060146, Written Opinion mailed Dec. 27, 2013", 5 pgs.
"International Application Serial No. PCT/US2013/062442, International Search Report mailed Feb. 18, 2014", 10 pgs.
"International Application Serial No. PCT/US2013/062442, Written Opinion mailed Feb. 18, 2014", 9 pgs.
"International Application Serial No. PCT/US2013/063063, International Search Report mailed Dec. 31, 2013", 5 pgs.
"International Application Serial No. PCT/US2013/063063, Written Opinion mailed Dec. 31, 2013", 4 pgs.
"International Application Serial No. PCT/US2013/064385, International Search Report mailed Jan. 29, 2014", 3 pgs.
"International Application Serial No. PCT/US2013/064385, Written Opinion mailed Jan. 29, 2014", 8 pgs.
"International Application Serial No. PCT/US2013/064387, International Search Report mailed Jan. 28, 2014", 4 pgs.
"International Application Serial No. PCT/US2013/064387, Written Opinion mailed Jan. 28, 2014", 4 pgs.
"International Application Serial No. PCT/US2013/065599, International Search Report mailed Feb. 10, 2014", 4 pgs.
"International Application Serial No. PCT/US2013/065599, Written Opinion mailed Feb. 10, 2014", 4 pgs.
"International Application Serial No. PCT/US2013/066786, International Search Report mailed Feb. 12, 2014", 4 pgs.
"International Application Serial No. PCT/US2013/066786, Written Opinion mailed Feb. 12, 2014", 6 pgs.
"International Application Serial No. PCT/US2013/067043, International Search Report mailed Feb. 25, 2014", 4 pgs.
"International Application Serial No. PCT/US2013/067043, Written Opinion mailed Feb. 25, 2014", 6 pgs.
"International Application Serial No. PCT/US2013/067306, International Search Report mailed Jan. 17, 2014", 3 pgs.
"International Application Serial No. PCT/US2013/067306, Written Opinion mailed Jan. 17, 2014", 7 pgs.
"International Application Serial No. PCT/US2013/067317, International Search Report mailed Feb. 7, 2014", 3 pgs.
"International Application Serial No. PCT/US2013/067317, Written Opinion mailed Feb. 7, 2014", 7 pgs.
"International Application Serial No. PCT/US2013/067522, International Search Report mailed Feb. 12, 2014", 3 pgs.
"International Application Serial No. PCT/US2013/067522, Written Opinion mailed Feb. 12, 2014", 6 pgs.
"International Application Serial No. PCT/US2013/067575, International Search Report mailed Feb. 21, 2014", 3 pgs.
"International Application Serial No. PCT/US2013/067575, Written Opinion mailed Feb. 21, 2014", 6 pgs.
"Radio Frequency (RF) requirements for Multicarrier and Multiple Radio Access Technology (Multi-RAT) Base Station (BS)", 3GPP TR 37.900 V11.0.0. Technical Specification Group Radio Access Network. Release 11., (Sep. 24, 2012), 75 pgs.
"Relay System Simulation Results with Coverage Boosting and Control Channel Modeling", 3GPP TSG RAN WG1 Meeting #59, R1-094838, Motorola, (2009), 12 pgs.
"Telecommunication management; Self-Organizing Networks (SON); Self-healing concepts and requirements", 3GPP TS 32.541 V10.0.0. Technical Specification Group Services and System Aspects. Release 10., (Mar. 2011), 21 pgs.
"Triggering a detached MTC device", InterDigital Communications, TD S2-110673, 3GPP TSG SA WG2 Meeting #83, (Feb. 2011), 4 pgs.
"TSG-SA5 Meeting #86 Change Request 32.766", New Orleans. S5-123194., (Nov. 12, 2012), 26 pgs.
Doppler, Klaus, et al., "Device-to-Device Communication as an Underlay to LTE-Advanced Networks", IEEE Communications Magazine, 47(12), (Dec. 2009), 42-49.
Lei, Lei, et al., "Operator controlled device-to-device communications in LTE-advanced networks", IEEE Wireless Communications, 19(3), (Jun. 2012), 96-104.
"U.S. Appl. No. 14/126,654, Non Final Office Action mailed Nov. 6, 2014", 34 pgs.

\* cited by examiner

METHOD TO ENABLE OPTIMIZATION FOR SMALL DATA IN AN EVOLVED PACKET CORE (EPC)

CLAIM OF PRIORITY

This application is a U.S. National Stage Application filed under 35 U.S.C. 371 of International Application No. PCT/US2013/067043, filed Oct. 28, 2013, which claims the benefit of priority to U.S. Provisional Patent Application Ser. No. 61/721,436, filed on Nov. 1, 2012, which applications are incorporated herein by reference in their entireties.

BACKGROUND

Machine to Machine (M2M) communication (also referred to as "machine-type communications" or "MTC") may be used in a variety of areas. M2M communication may use a device such as a sensor or meter to collect data which may be relayed through a network (e.g., wireless, wired, or hybrid), as part of a trigger request or in response to a trigger request, to an application that translates the data into meaningful information. In the area of security, M2M communication may be used in surveillance systems, in backup of telephone landlines, in the control of physical accesses (e.g. to buildings), and in car/driver security. In the area of payment systems, M2M communication may be used in point of sales, vending machines, customer loyalty applications, and gaming machines. In the area of remote maintenance/control, M2M communication may be used in programmable logic controllers (PLCs), sensors, lighting, pumps, valves, elevator control, vending machine control, and vehicle diagnostics. In the area of metering, M2M communication may be used in applications related to power, gas, water, heating, grid control, and industrial metering. Additionally, M2M communication based on machine type communication (MTC) technology may be used in areas such as customer service.

M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), Long Term Evolution Advanced (LTE-Advanced), and/or other technologies such as WiMAX (Worldwide Interoperability for Microwave Access) or those developed by the Institute for Institute of Electrical and Electronics Engineers (IEEE) and 3GPP2. M2M communications may use networks based on these technologies to deliver business solutions in a cost-effective manner. In a circumstance involving ubiquitous deployment of wireless networks, the availability of the wireless networks may facilitate and/or encourage the deployment and use of M2M.

For MTC Device triggering operation, the network triggers MTC devices to initiate communication with the MTC server based on a trigger indication from the MTC Server. A MTC device receives trigger indications from the network and establishes communication with the MTC server when receiving the trigger indication.

Device Triggering is the means by which a services capability server (SCS) sends information to user equipment (UE) via the third generation partnership project (3GPP) network to trigger the UE to perform application specific actions that include initiating communication with the SCS for the indirect model or an application server (AS) in the network for the hybrid model. Device triggering is required when an IP (internet protocol) address for the UE is not available or reachable by the small computer system interface (SCSI) AS.

Expansion of mobile networks has facilitated growth of M2M communication. Although the amount of trigger requests, triggers, and data sent by M2M devices is very small, a large number of these devices, in combination, may increase load on a network. Thus, a large number of device triggering and small data requests can cause signaling surge in the system and impact on the batter of the UE if the UE toggles between idle mode and connected mode state. This is especially true for mobile data applications that send triggers/small data frequently.

DETAILED DESCRIPTION

Figure 1:
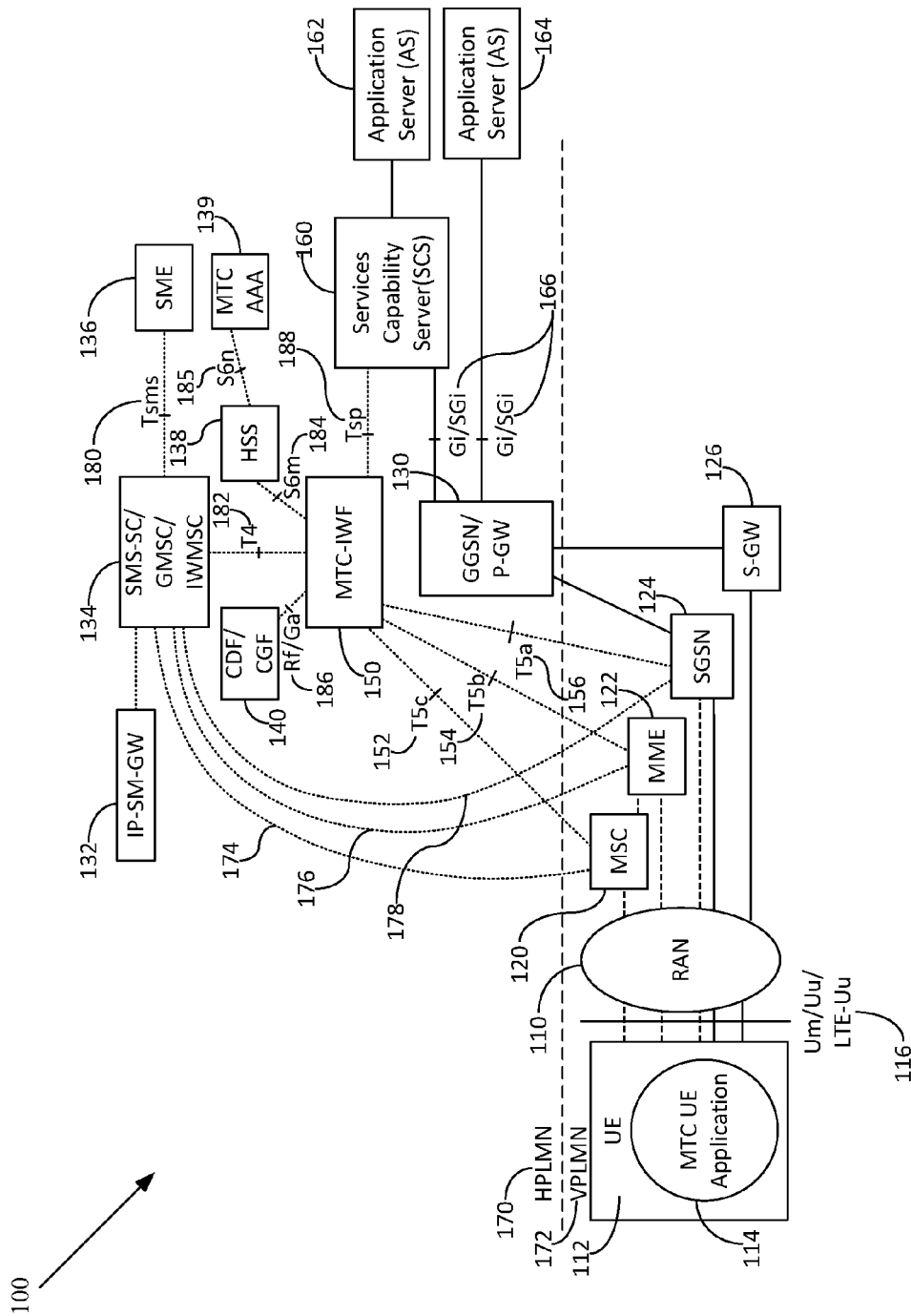
FIG. 1 illustrates an architecture for supporting machine-type communication (MTC) according to an embodiment.

Embodiments described herein provide optimization for small data in an evolved packet core (EPC). An optimization mechanism is provided for small data and device triggering enhancement (SDDTE) to allow mobile switching center (MSC), serving general packet radio service (GPRS) support node (SGSN), and/or a mobility management entity (MME) to gather and hold-on the device trigger messages, small data and downlink data notifications within a time frame provided by a SDDTE optimization timer, which can be either pre-configured or retrieved from other network elements. An optimization mechanism for SDDTE according to an embodiment allows a serving gateway (S-GW) and/or a SGSN to buffer the small data and delay sending out downlink data notification within the time frame provided by the SDDTE optimization timer when a small data packet is determined to have been received by detection of the packet itself or by knowing the small data indication from other network elements such as a packet gateway (P-GW) or traffic detection function (TDF). The optimization mechanism for SDDTE may also allow machine-type communication interworking function (MTC-IWF) to buffer the device triggers, small data within the time frame of the SDDTE optimization timer when a device trigger or small data packet has been determined to have been received. The SDDTE optimization timer may be obtained from a home subscriber server (HSS), a home location register (HLR), a subscriber profile repository (SPR) and/or a user data repository (UDR).

An SDDTE optimization container stores the SDDTE parameters and may be maintained in the HSS, UDR or SPR, or alternatively may be pre-configured on the enforcing network elements, such as MSC/SGSN/MME, GGSN/S-GW/P-GW. An attach procedure is where the UE registers with the network. The attach procedure for LTE is combined with (default) PDN (IP) connectivity. During the attach procedure, the SDDTE Optimization Container may be provisioned from HSS to MSC/SGSN/MME and further provided to GGSN/S-GW, and further to P-GW. Alternatively, during attach procedure, PCRF can retrieve the SDDTE Optimization Container from SPR/UDR and further provision it to GGSN/P-GW/S-GW, and further to MSC/SGSN/MME.

For the case of small data going through the S-GW, the S-GW may be enhanced to implement DPI (deep packet inspection) to detect small data. Alternatively, the S-GW may detect the small data indication from the P-GW or TDF. The small data indicator may be carried in GPRS tunneling protocol user plane (GTP-U) header or GPRS tunneling protocol for control plane (GTP-C) messages.

For the case of holding on device triggers or small data on MTC-IWF, the MTC-IWF is enhanced to detect the mobility management (MM)/extended mobility management (EMM) state information from the HSS or SGSN/MME in order to behave accordingly in different MM/EMM states. To enforce the SDDTE optimization, the MTC-IWF obtains the SDDTE optimization container from the HSS or SPR/UDR. Furthermore, the MTC-IWF holds device triggers and buffers small data packets within the time frame identified by the SDDTE optimization waiting time.

FIG. 1 illustrates an architecture 100 for supporting machine-type communication (MTC) according to an embodiment. In FIG. 1, a radio access network (RAN) 110 provides a user equipment (UE) access to a communications network. The UE includes a machine type communication application 114. An Um/Uu/LTE-Uu interface 116 provides a signaling interface between the domain of the UE 112 and the access domain, i.e., RAN 110. The RAN 110 is coupled to a mobile switching center (MSC) 120, a mobile management entity (MME) 122, a serving general packet radio service (GPRS) support node (SGSN) 124 and a serving gateway (S-GW) 126. The network 100 may be divided into a home public land mobile network (HPLMN) 170 and a visited public land mobile network (VPLMN) 172.

The MSC 120 acts like a switching node within a PSTN or ISDN, but also provides additional functionality to enable support of a mobile user. These include registration, authentication, call location, inter-MSC handovers and call routing to a mobile subscriber. The MME is a control-node and is responsible for idle mode UE (User Equipment) tracking and paging procedure including retransmissions. The MME is involved in the bearer activation/deactivation process and is also responsible for choosing the S-GW 126 for a UE at the initial attach, where the UE registers with the network, and at time of intra-LTE handover involving Core Network (CN) node relocation.

The SGSN 124 is responsible for the delivery of data packets from and to the UEs within its geographical service area. The SGSN 124 handles packet routing and transfer, mobility management (attach/detach and location management), logical link management, and authentication and charging functions. The S-GW 126 routes and forwards user data packets, while also acting as the mobility anchor for the user plane during inter-eNodeB handovers and as the anchor for mobility between LTE and other 3GPP technologies.

The S-GW 126 is coupled to a gateway GPRS support node/packet gateway (GGSN/PGW) 130. A GGSN 130 manages the internetworking between a GPRS network and external packet switched networks, like the Internet and X.25 networks. A GGSN 130 also enables the mobility of the user terminal in the GPRS/UMTS networks and maintains routing to tunnel the protocol data units (PDUs) for servicing a particular UE. A PGW 130 provides connectivity from the UE to external packet data networks by being the point of exit and entry of traffic for the UE. The P-GW 130 performs policy enforcement, packet filtering for a user, charging support, lawful interception and packet screening. A PGW 130 may also act as an anchor for mobility between 3GPP and non-3GPP technologies, such as WiMAX and 3GPP2.

The MSC 120, MME 122 and the SGSN are coupled to a machine type communication interworking functions (MTC-IWF) 150. The MTC-IWF 150 interfaces with other 3GPP entities for providing various MTC services. For example, the MTC-IFW 150 supports device trigger functionality over Tsp and T4 reference points and may generate the charging data records (CDRs) for the device trigger. While embodiments are described herein using device messages, other types of messaging may also be used according to embodiments, e.g., small data transmissions, etc. Small data transmissions are transmissions wherein the data is smaller or comparable with the size of the exchanged signaling needed to establish the data connection. The exact definition of "small data" is subject of the 3GPP standardization. For example, small data transmissions are detailed at 3GPP TR 23.888 v11.0.0 (2012-09), with an overview of the concept at section 5.5.1. As stated for stage 1 device trigger or data via SMS, the small data upper limit may, for example, be around 1000 octets. However, the meaning/volume of 'small' is not defined and may differ from system to system and based on some subscription criteria.

The MTC-IWF 150 is coupled to the charging data function/charging gateway function (CDF/CGF) 140, a 3GPP home subscriber server (HSS) 138, and short message service-service center/gateway mobile switching center/interworking mobile switching center (SMS-SC/GMSC/IWMSC) 134. Charging function addresses are addresses distributed to IMS entities and provide a common location for an entity to send charging information. CDF addresses are used for offline billing and Online Charging Function (OCF) for online billing. The CDF 140 will collect accounting information, and build a Call Detail Record (CDR), which is sent to the billing system (BS) of the domain. The charging gateway function (CGF) 140 listens to messages providing charging data that is sent from the general packet radio service (GPRS) support nodes (GSNs). The CGF retrieves charging data records (CDRs) from the GGSN. The 3GPP HSS 138 maintains the master database for a given user. The HSS 138 is the entity containing the subscription-related information to support the network entities actually handling calls/sessions. An MTC authentication, authorization and accounting (AAA) 139 is used in the Home Public Land Mobile Network (HPLMN), e.g., the network in which the subscriber profile is held, to support translation of the International Mobile Subscriber Identity (IMSI) to external identifiers at the network egress. The MTC AAA 139 may terminate the S6n 185 reference point where the MTC-AAA 139 communicates with the HLR/HSS 138, return the external identifiers corresponding to an IMSI and query the HSS 138 with IMSI to retrieve the external identifiers and cache IMSI/external identifier mapping to avoid multiple queries to the HSS 138.

In FIG. 1, the SMS-SC/GMSC/IWMSC 134 includes the SMS-SC, the SMS-GMSC and the SMS-IWMSC. The SMS-SC of the SMS-SC/GMSC/IWMSC 134 acts as a store and forward center for SMS messages. The Short Message Service Gateway MSC (SMS-GMSC) and the Short Message Service Interworking MSC (SMS-IWMSC) connect the SMS-SC to the GPRS network. The SMS-GMSC and SMS-IWMSC are connected to the SGSN through connection 178 to enable GPRS UEs to send and receive SMS messages through the SGSN. The SMS-IWMSC may receive SMS messages from a public land mobile network (PLMN) and submit them to the receiving SMS-SC. The SMS-SC/GMSC/IWMSC 134 may also be coupled to the MSC 120 via connection 174 and to MME 122 via connection 176. The SMS-SC/GMSC/IWMSC 134 may be further coupled to an Internet Protocol-Short-Message-Gateway (IP-SM-GW) 132 and short message entities (SME) 136. The IP-SM-GW 132 provides the protocol interworking for the submission of short messages. The SME 136 includes network entities, e.g., mobile stations, cell phones, UEs, that can send/receive short messages.

The MTC-IWF 150 is further coupled to a services capability server (SCS) 160. The SCS connects MTC application servers (AS) 162 to the 3GPP network to enable them to communicate through specific 3GPP defined services with UEs 112 used for MTC and with the MTC-IWF 150. The SCS offers capabilities for use by one or multiple MTC AS 162. An AS 164 may also be coupled to the GGSN/PGW 130. Thus, an AS 164 may connect directly to the operator network in order to perform direct user plane communications with a UE 112. However, SCS 160 may provide value added services for MTC and perform user plane and/or control plane communication with the UE. The Tsp interface is an inter-domain interface for control plane communication. The Tsp interface 188 may deliver a device trigger request from SCS 160 to MTC-IWF 150, and reports the acceptance/success (or the non-acceptance/failure) of this request. The Tsms interface 180 may be used to send a trigger to a MTC UE encapsulated in a Mobile Terminating-SMS (MT-SMS) as an over-the-top application by any network entity (e.g., SCS) acting as a SME. The T4 interface 182 may be used to transfer a device trigger from MTC-IWF 150 to SMS-SC 160, provides serving node's information corresponding to IMSI, and reports the success or failure of delivering a device trigger to the MTC UE 112. The S6m interface 184 maps MSISDN or external identifier to IMSI and resolves the serving nodes identities of the MTC UE 112.

The T5a 156, T5b 154 and T5c 152 reference points connect the MTC-IWF 150 to the serving SGSN 124, connects the MTC-IWF 150 to the serving MME 122, and connect the MTC-IWF 150 to the serving MSC 120, respectively. The T5a 156, T5b 154 and T5c 152 reference points also support device trigger functionality, including the transfer of a device trigger request to the MSC 120, MME 122, SGSN 124, reporting to the MTC-IWF 150 the success or failure of delivering a device trigger to the UE 112 and providing MME 122/SGSN 124 congestion/load information to the MTC-IWF 150. The Gi/SGi interface 166 provides an interface into packet data networks (PDN). The SGi is the interface to the IP packet data network and the Gi is the interface to external packet data networks, e.g., Internet, and contains the end-user's IP point of presence. The Rf/Ga interface 186 provides interface signal between the MTC-IWF 150 and the CDF/CGF 140. The RF interface provides access to CTF of the CDF/CGF 140 and the Ga interface provides access to the CGF of the CDF/CGF 140.

End-to-end services between the M2M Applications in the UEs 112 and the M2M applications provided at the MTC AS 162 in the external network use services provided by the 3GPP2 system, and optionally services provided by the SCS 160. The 3GPP2 system provides transport and communication services, including 3GPP2 bearer services, e.g., IMS and SMS, and various optimizations, that can facilitate M2M type of services. As described above, the SCS 160 connects MTC application servers (AS) 162 to the 3GPP network to enable them to communicate through specific 3GPP defined services with UEs 112 used for MTC and with the MTC-IWF 150. For example, the MTC-IWF 150 is arranged to support reception of a device trigger request from the SCS 160, reporting to the SCS 162 the acceptance or non-acceptance of the device trigger request, reporting to the SCS 162 the success or failure of a device trigger delivery if known, providing load control information to the SCS 162 as part of the response to trigger requests.

The MTC-IWF 150 may transmit an SMS request in terms of an MTC device trigger. MTC device triggering may start from an MTC application at an AS 162. The MTC application at the AS 162 may communicate with the SCS 160 for MTC device triggering. The SCS 160 may transmit a request for device triggering to the MTC-IWF 150 with external MTC device identities, UE 112, via the Tsp interface 188.

Device-Action commands and Device Notification commands are used to support MTC between the MTC-IWF 150 and the SCS 160. A Device-Action-Request (DAR) command may be sent by the SCS 160 to the MTC-IWF 150 to request an action. For T4 device triggering, the MTC-IWF 150 may send an SMS-SC 160 a Submit Trigger Replace/Recall Request with an external identifier or MSISDN, IMSI, SCS Identifier, old device trigger reference number, new device trigger reference number, validity period, priority, trigger payload, etc. The new device trigger reference identifies a new device trigger request for substituting with the old device trigger request identified by the old device trigger reference number.

When the DAR is a Submit Trigger Replace Request, a new device trigger reference is provided to distinguish the old device trigger reference from the new device trigger reference. For T5 device triggering, the MTC-IWF 150 identifies which trigger message is to be replaced/recalled using the old device trigger reference number, and, if the DAR command is a replace command, using the new device trigger reference.

The SMS-SC 160 may send the MTC-IWF 150 a Submit Trigger Replace/Recall Response message. If the old device trigger request is pending at the SMS-SC 160 or has been delivered to the UE with failure, the SMS-SC 160 may send to the MTC-IWF 150 a Submit Trigger Replace/Recall Response message indicating old device trigger request has been successfully replaced/recalled (deleted). The SMS-SC 160 may also send the MTC-IWF 150 a Trigger Delivery Report for the original trigger message indicating that the old device trigger request has been replaced/recalled.

If the old device trigger request has successfully been delivered to the UE, or if the old device trigger request has expired, the SMS-SC 160 may send to the MTC-IWF 150 a Submit Trigger Replace Response message indicating that the old device trigger has successfully delivered and that the SMS-SC 160 will deliver the new device trigger request. For a recall request, the SMS-SC 160 may send to the MTC-IWF 150 a Submit Trigger Replace Response message with a cause value indicating that the replace request failed.

Accordingly, the same message DAR can be used for trigger replace and recall. The Device-Action commands and Device Notification commands include Attribute Value Pairs (AVPs) for providing information relevant to the commands. Thus, data delivered between the MTC-IWF 150 and the SCS 160 is may be provided in the form of AVPs having values set therein. However, the device trigger recall/replace can be new messages instead of new AVP of Action Type AVP.

Table 1 lists a few AVPs associated Device-Action commands and Device Notification commands according to an embodiment.

TABLE 1

| | |
|---|---|
| Device-Action AVP | Used By The SCS To Request A Specific Action For A Device |
| Device-Notification AVP | Used By The MTC-IWF To Report Any Action Requested By The SCS |
| Action-Type AVP | Informs The MTC-IWF Of What Action Type Is Asked For In The Request And Also Informs The SCS Of What Action Type Is Reported |
| Request-Status AVP | Informs The SCS Of The Status Of A Device-Action Request May Be Included In The Device-Action-Answer Command |
| Delivery-Outcome AVP | Informs The SCS Of The Outcome Of The Device-Action Request |
| Reference-Number AVP | Uniquely Identifies A Transaction; Allocated By The Initiator Of A Transaction And Is Used In Subsequent Messages Related To That Transaction |

As shown in Table 1, a Device-Action AVP is used by the SCS 160 to request a specific action for a device. A Device-Notification AVP is used by the MTC-IWF 150 to report any action requested by the SCS 160. An Action-Type AVP informs the MTC-IWF 150 of what action type is to be used in the request and also informs the SCS 160 of what action type is reported. A Request-Status AVP informs the SCS 160 of the status of a Device-Action Request. The Request-Status AVP can be included in the Device-Action-Answer command. A Delivery-Outcome AVP informs the SCS of the outcome of the Device-Action Request.

Table 2 lists the four values for the Action-Type AVP according to an embodiment. In Table 2, the information element name, the mapping to Diameter AVP and description are provided.

TABLE 2

| Information Element Name | Mapping to Diameter AVP | Description |
|---|---|---|
| Device Trigger Request | Action-Type | This Specifies A Device Trigger Request And Is Used In The Device-Action AVP Of The Device-Action Request Command And In The Device-Notification AVP Of The Device-Action Answer Command |
| Delivery Report | Action-Type | This Specifies That A Delivery Report Sent From MTC-IWF To The SCS |
| Trigger Recall Request | Action-Type | This Specifies That A Trigger Identified By A Trigger Reference Number Has To Be Deleted |
| Trigger Replacement Request | Action-Type | This Specifies That A Trigger Identified By A Trigger Reference Number Has To Be Replaced With the new Device Trigger Request |

The Action-Type AVP according to an embodiment now includes four values. The Action-Type AVPs includes a Device Trigger Request value and a Delivery Report value. However, two device trigger action requests are added to the available Action-Type AVPs according to an embodiment. The two device trigger action requests include a Device Trigger Recall Request value and a Device Trigger Replace Request value according to an embodiment.

The Device Trigger Request value indicates a device trigger request and is used in the Device-Action AVP of the Device-Action-Request command and in the Device-Notification AVP of the Device-Action-Answer command. The Delivery Report value indicates a delivery report sent from MTC-IWF to the SCS and is used in the Device-Notification AVP of the Device-Notification-Request command.

The Device Trigger Recall Request value has been added to the Device-Action AVP to indicate a device trigger recall request and is used in the Device-Action AVP of the Device-Action Request command A Device Trigger Replace Request value has been added to the Device-Action AVP to indicate a device trigger replace request and is used in the Device-Action AVP of the Device-Action Request command.

Figure 2:
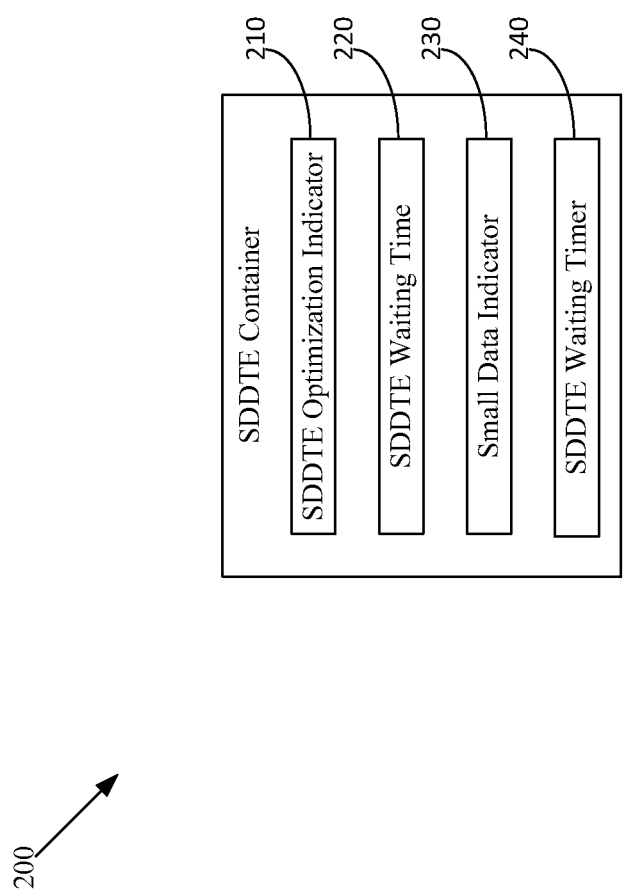
FIG. 2 illustrates a small data and device triggering enhancement (SDDTE) container according to an embodiment.

FIG. 2 illustrates a SDDTE container 200 according to an embodiment. The SDDTE container 200 includes parameters for SDDTE optimization such as an SDDTE optimization indicator 210, an SDDTE waiting time 220, etc. The SDDTE container 200 may be pre-configured on the MSC/SGSN/MME, GGSN/S-GW/P-GW, or stored in HSS/HLR/UDR/SPR as part of subscriber profile or policy profile.

In FIG. 2, the SDDTE container 200 includes an SDDTE optimization indicator 210 to allow core network elements, such as MSC/SGSN/MME, GGSN/S-GW, or P-GW, to gather and hold-on/buffer the device triggers, downlink data notification or small data for a while. An SDDTE waiting time 220 identifies the time for the network element to gather and hold-on/buffer the device triggers, small data or paging notifications. A small data indicator 230 is used by downlink data notification message from S-GW to MME to indicate that the downlink data packet is a small data. An SDDTE waiting timer 240 is used to gather and hold-on/buffer the incoming device triggers, small data or small data notifications. The value of the SDDTE waiting timer 240 may be set to either a discontinuous reception (DRX) cycle length or an SDDTE waiting time. A network operator may determine how to set the value of the SDDTE waiting timer based on a predetermined policy and configuration.

Figure 3:
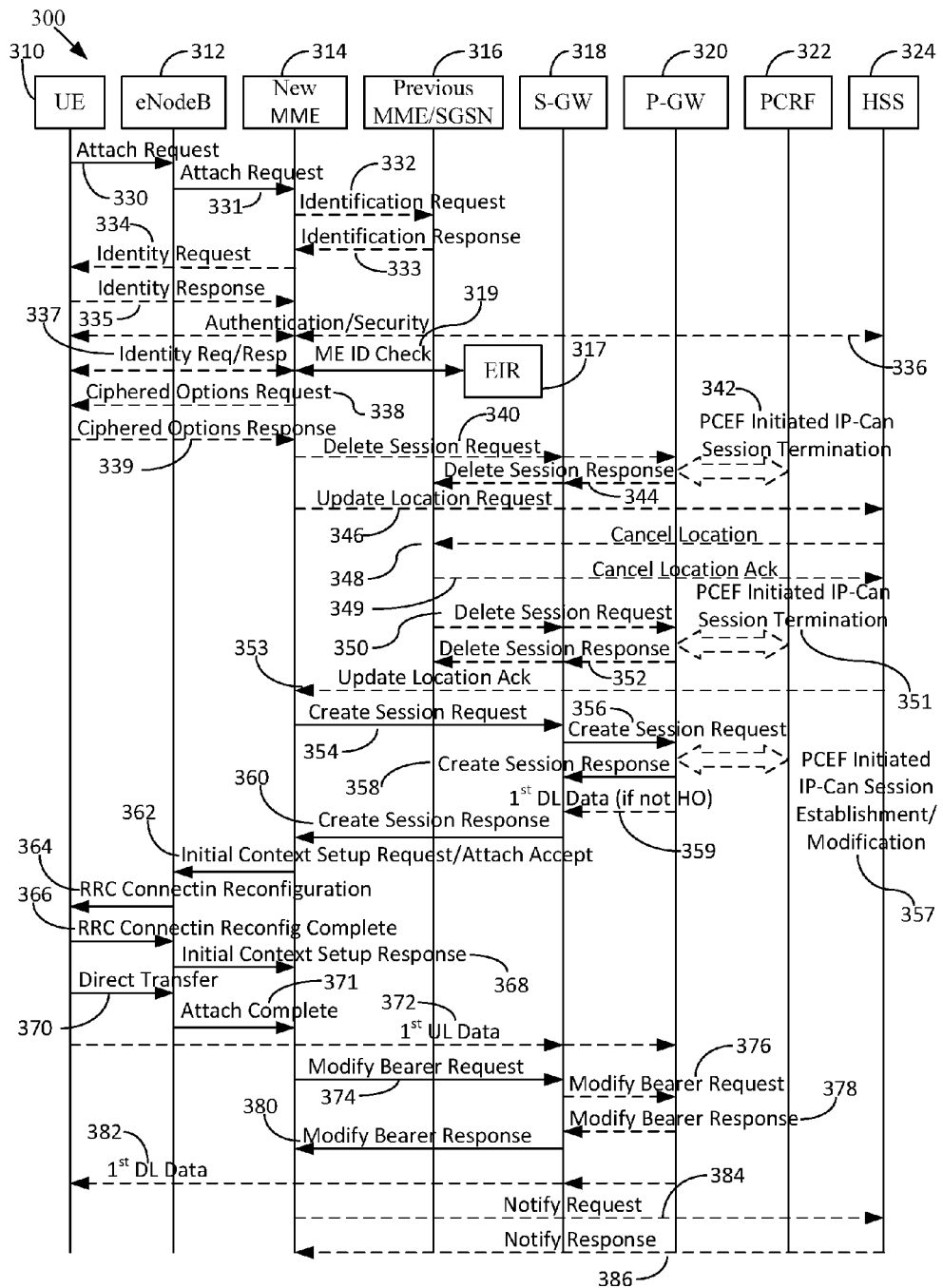
FIG. 3 illustrates an attach procedure according to an embodiment.

FIG. 3 illustrates an attach procedure 300 according to an embodiment. An attach procedure is where the UE 310 registers with the network. The attach procedure 300 for LTE is combined with (default) PDN (IP) connectivity. In FIG. 3, signaling between user equipment 310, an evolved node B 312 (eNodeB or eNB), a new MME 314, a previous MME/SGSN 316, an equipment identity register (EIR) 317, a serving gateway (S-GW) 318, a packet data network gateway (P-GW) 320, a policy and charging rules function (PCRF) 322, and an HSS 324. In FIG. 3, an attach request 330 is sent from UE 310 to an eNode B 312. The attach request 331 is sent from the eNodeB 312 to the new MME 314. The new MME 314 sends an identification request 332 to the previous MME/SGSN 316. The previous MME/SGSN 316 sends an identification response 333 to the new MME 314. The new MME 314 sends an identity request 334 to the UE 310. The UE 310 sends the new MME 314 an identity response 335. The UE 310 communicates with the HSS 324 to perform authentication and security processes 336. If no UE context for the UE 310 exists anywhere in the network, if the attach request 330 was not integrity protected, or if the check of the integrity failed, then authentication and NAS security setup to activate integrity protection and NAS ciphering are performed. Thereafter, NAS messages are protected by the NAS security functions (integrity and ciphering) indicated by the new MME 314 unless the UE 310 is emergency attached and not successfully authenticated.

An identity request/response sequence 337 is performed by the UE 310 and the new MME 314 to provide the new MME 314 with the mobile equipment (ME) identity of the UE 310. The new MME 314 sends the ME identity check request 319 (e.g., the ME Identity, IMSI) to the EIR 317. The EIR 317 respond with ME identity check acknowledgement (Result) 319. Dependent upon the result, the new MME 314 decides whether to continue with the attach procedure or to reject the UE 310. If the UE 310 has set the ciphered options transfer flag in the attach request message, the ciphered options are requested 338 from the UE 310 by the new MME 314 and a cipher options response 339 is provided to the new MME 314 by the UE 310. If there are active bearer contexts in the new MME 314 for this particular UE 310, i.e., the UE 310 re-attaches to the new MME 314 before properly detaching, the new MME 314 deletes these bearer contexts by sending delete session request messages 340 to the GWs, e.g., S-GW 318, P-GW 320 involved. The GWs acknowledge with delete session response (Cause) message 344. If a PCRF 322 is deployed, the P-GW 320 employs an IP-CAN (internet protocol connectivity access network) session termination procedure 342 to indicate that resources have been released. If the MME 314 has changed since the last detach, if there is no valid subscription context for the UE 310 in the new MME 314, or other predetermined circumstances, the new MME 314 sends an update location request message 346 to the HSS 324.

The HSS 324 then sends cancel location 348 (IMSI, cancellation type) to the previous MME 316. The previous MME 316 acknowledges with cancel location acknowledgement 349 and removes the MM and bearer contexts. If the ULR-Flags indicates "initial-attach-indicator" and the HSS has the SGSN registration, then the HSS 324 sends cancel location message 349 to the previous MME/SGSN 316. The cancellation type indicates the previous MME/SGSN 316 to release the previous S-GW resource. If there are active bearer contexts in the previous MME/SGSN 316 for this particular UE 310, the previous MME/SGSN 316 deletes these bearer contexts by sending delete session request messages 350 to the GWs involved, e.g., S-GW 318, P-GW 320. The GWs return delete session response (Cause) message 352 to the previous MME/SGSN 316. If a PCRF 322 is deployed, the P-GW 320 employs an IP CAN session termination procedure 351 to indicate that resources have been released. The HSS 324 acknowledges the update location message by sending an update location acknowledgement message 353 to the new MME 314. The new MME 314 sends a create session request 354. The S-GW 318 creates a new entry in its EPS bearer table and sends a create session request message 356 to the P-GW 320 indicated by the P-GW address received in the create session request message 356. After this step, the S-GW 318 may buffers any downlink packets it may receive from the P-GW 320 while a downlink data notification message is not sent to the new MME 314 until it receives the modify bearer request message below.

The P-GW 320 and the PCRF 322 establish or modify the PCEF initiated IP-CAN session 357. The P-GW 320 creates a new entry in its EPS bearer context table and generates a charging identifier. The new entry allows the P-GW 320 to route user plane PDUs between the S-GW 318 and the packet data network, and to start charging. The P-GW 322 returns a create session response message 358 to the S-GW 318. The P-GW 320 takes into account the received PDN type, the dual address bearer flag and the policies of operator when the P-GW 320 selects the PDN type to be used. If the MS info change reporting action (Start) and/or the CSG information reporting action (Start) are received for this bearer context, then the S-GW 318 stores this information for the bearer context and the S-GW 318 reports to that P-GW 320 whenever a UE's 310 location and/or User CSG information change occurs that meets the create session request 358 of the P-GW 320. The S-GW 318 returns a create session response message 360 to the new MME 314.

The new MME 314 sends an attach accept message 362 to the eNodeB 312. The eNodeB 312 sends the RRC connection reconfiguration message 364 including the EPS radio bearer identity to the UE 310, and the attach accept message will be sent along to the UE 310. The UE 310 sends the RRC connection reconfiguration complete message 366 to the eNodeB 312. The eNodeB 312 sends the initial context response message 368 to the new MME 314. The UE 310 sends a direct transfer message 370 to the eNodeB 312, which includes the attach complete message. The eNodeB 312 forwards the attach complete message 371 to the new MME 314 in an uplink NAS transport message. After the attach accept message 371 and once the UE has obtained a PDN Address, the UE 310 can then send uplink packets 372 towards the eNodeB 312 which will then be tunneled to the S-GW 318 and P-GW 320.

Upon reception of the initial context response message 362 and the attach complete message 371 above, the new MME 314 sends a modify bearer request message 374 to the S-GW 318. If the handover indication is included above, the S-GW 318 sends a modify bearer request (handover indication) message 376 to the P-GW 320 to prompt the P-GW 320 to tunnel packets from non 3GPP IP access to 3GPP access system and immediately start routing packets to the S-GW 318 for the default and any dedicated EPS bearers established.

The P-GW 320 acknowledges by sending modify bearer response 378 to the S-GW 318. The S-GW 318 acknowledges by sending update bearer response (EPS bearer identity) message 380 to the new MME 314. The S-GW 318 can then send its buffered downlink packets. After the modify bearer response message 380 is sent from S-GW 318 to the new MME 314, the UE 310 may then receive downlink packets 382 from the S-GW 318 and P-GW 320.

After the new MME 314 receives modify bearer response (EPS bearer identity) message 380, if request type does not indicate handover and an EPS bearer was established and the subscription data indicates that the user is allowed to perform handover to non-3GPP accesses, and if the new MME 314 selected a P-GW 320 that is different from the P-GW 320 which was indicated by the HSS 324 in the PDN subscription context, the new MME 314 sends a notify request 384 including the APN and P-GW identity to the HSS 324 for mobility with non-3GPP accesses. The notify request 384 message may include information that identifies the PLMN in which the P-GW 320 is located. The HSS 324 stores the APN and P-GW identity pair and sends a notify response 386 to the new MME 314.

Figure 4:
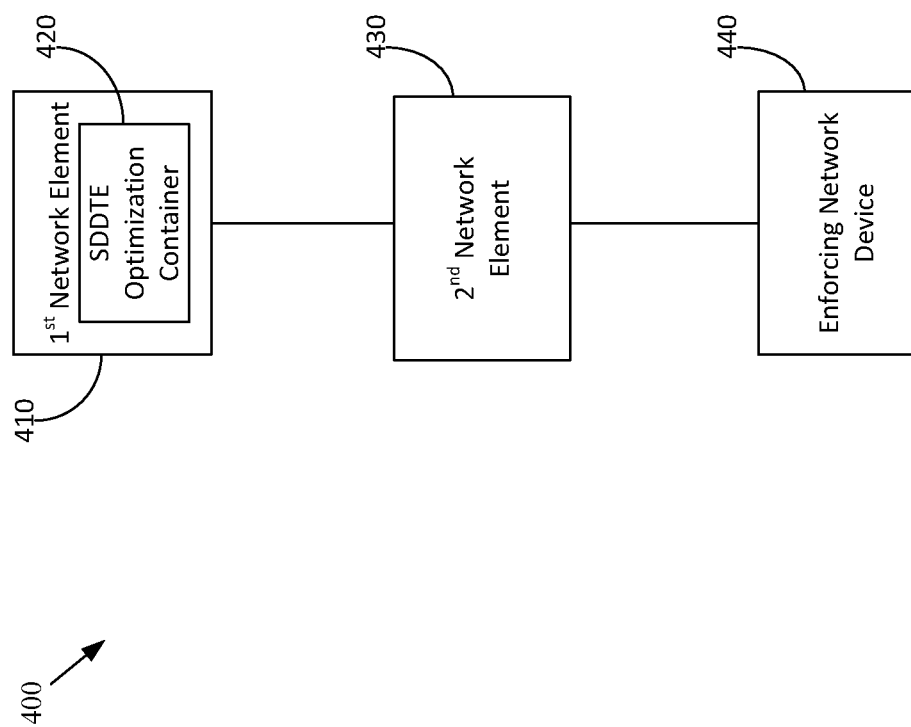
FIG. 4 illustrates SDDTE optimization according to an embodiment.
Figure 5:
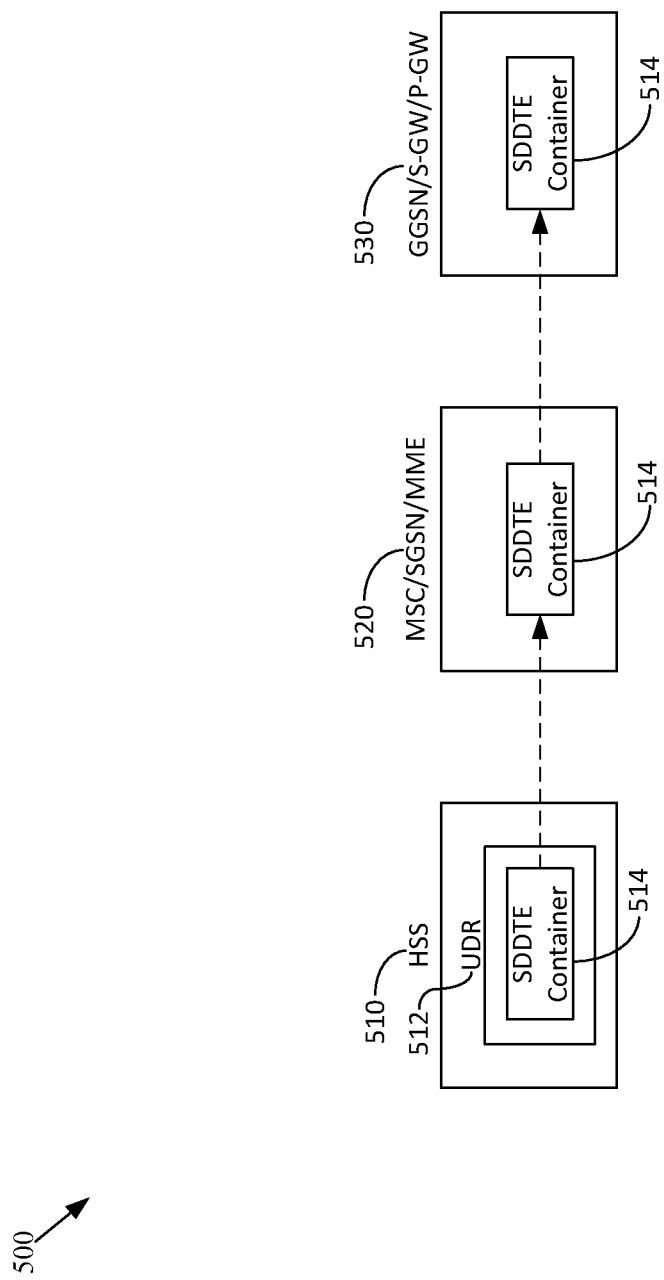
FIG. 5 illustrates SDDTE container provisioning according to an embodiment.

FIG. 4 illustrates SDDTE optimization 400 according to an embodiment. In FIG. 4, a SDDTE optimization container 420 is stored on a first network element 410. The SDDTE optimization container 420 is arranged to provide parameters for SDDTE optimization. The first network element 410 may include a HSS, UDR, SPR, MSC, SGSN, MME, GGSN, S-GW, P-GW and/or MTC-IWF. A second network element 430 is coupled to the first network element 410 and is arranged to receive the SDDTE optimization container 420 from the first network element 410. The second network element 430, upon receipt of the SDDTE optimization container 420 from the first network element 410, determines how to provision the SDDTE optimization according to the parameters provided by the SDDTE optimization container 420. The second network element 430 may include a PCRF, a SPR, a UDR, and/or a HSS. The PCRF, during an attach procedure and upon receipt of the SDDTE optimization container 420 from the first network element 410, provisions the SDDTE optimization container 420 to an enforcing network device 440. For example, an HSS, during an attach procedure, may provision the SDDTE optimization container 420 to an enforcing network device 440. An enforcing network device 440 may include MSC, SGSN, MME, GGSN, S-GW and P-GW. An enforcing network device 440 is arranged to gather and hold/buffer device trigger messages, small data and/or downlink data notifications for a time period set by an SDDTE optimization timer from the SDDTE optimization container 420 upon detection of receipt of a device trigger or small data packet FIG. 5 illustrates SDDTE container provisioning 500 according to an embodiment. In FIG. 5, the SDDTE container 514 is part of a subscriber profile and is stored in HSS 510/UDR 512. During an attach procedure, the MSC/SGSN/MME 520 obtains the SDDTE container 514 from the HSS 510/HSS-FE and passes it to GGSN/S-GW/P-GW 530 during the PDP context creation or EPS session creation procedure. Referring to FIG. 3, the update location acknowledgement 353 may be used to download the SDDTE container 514 from the HSS 510 or the UDR 512 that serves the HSS-FE as part of the subscriber profile.

During active/sleep mode operation, the MSC/SGSN/MME 520 behaves as usual because there is a user plane interface (see Um/Uu/LTE-Uu 116 in FIG. 1) to the RAN/UTRAN/E-UTRAN (see RAN 110 in FIG. 1), and there is no need to gather and buffer device triggers, small data packets. During idle mode operation, for the device triggering case, if the device trigger message arrives at the MSC/SGSN/MME 520, the MSC/SGSN/MME 520 will check whether SDDTE optimization indicator in the SDDTE container 514 is set, and if so, the MSC/SGSN/MME 520 will hold-on the message during the time frame provided by the SDDTE waiting timer in the SDDTE container 514. During this period, if more device triggers come in, they will be held on as well.

Figure 6:
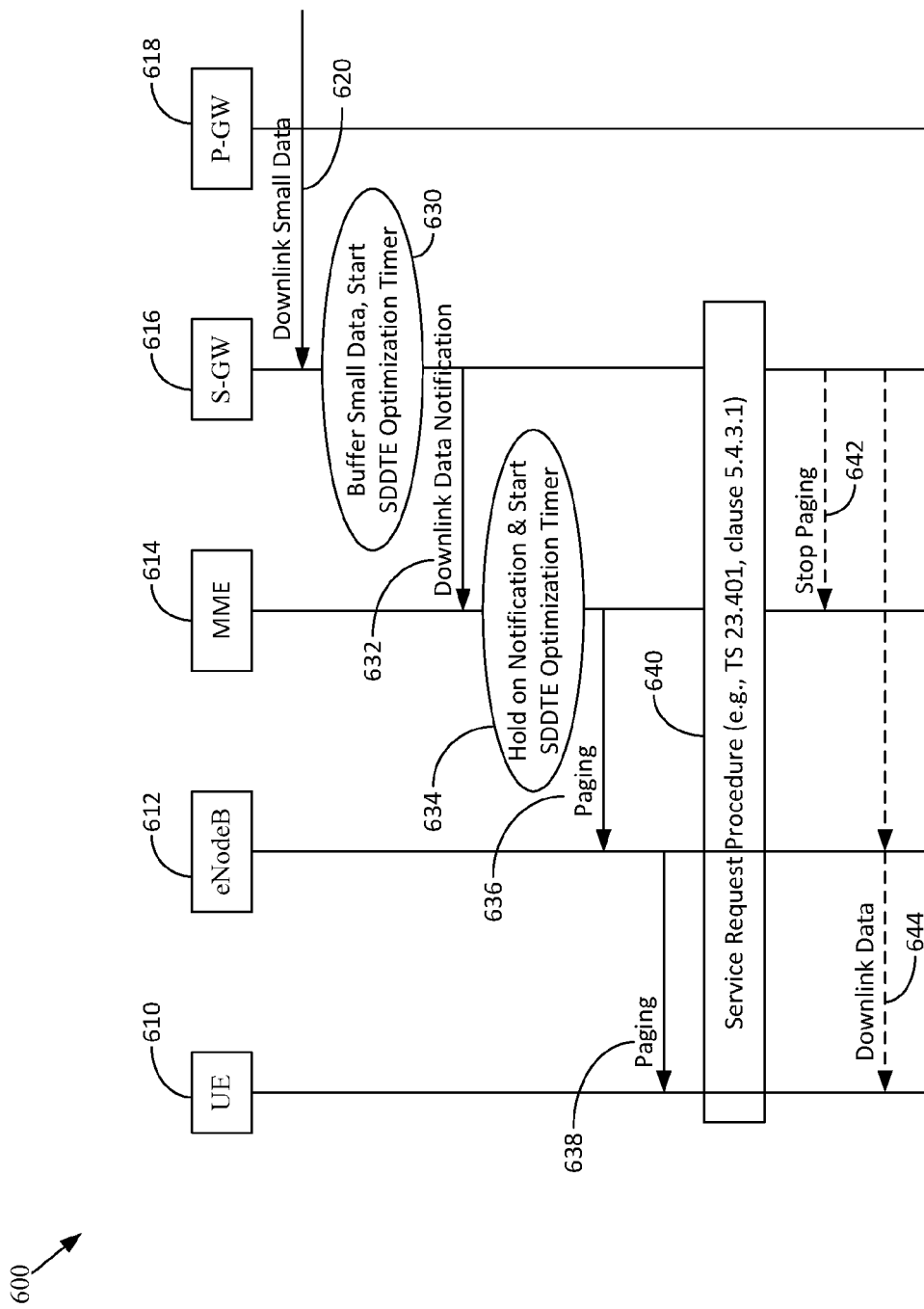
FIG. 6 illustrates an enhanced paging procedure for LTE according to an embodiment.

FIG. 6 illustrates an enhanced paging procedure for LTE 600 according to an embodiment. In FIG. 6, the network includes a user equipment 610, an eNodeB 612, an MME 614, a S-GW 616 and a P-GW 618. The S-GW 616 receives downlink small data 620. For the small data case, the MSC/SGSN can detect if it's a small data packet by itself in a 2G/3G network when the SDDTE optimization indicator is set. For LTE, the S-GW 616 recognizes that the SDDTE optimization indicator is set and detects if it's a small data packet. If so, the S-GW 616 will hold-on the small data packet during the time frame of the SDDTE optimization timer and send the downlink data notification with a small data indicator to the MME 614.

Accordingly, the S-GW 616 may start the SDDTE optimization timer by delaying the transmission of the downlink data notification 632 to MME 614. During this period, if more small data packets come in, they will be buffered 630 by the S-GW 616. During this time, the S-GW 616 will not send any downlink data notification 632 to MME 614 if the priority of the incoming data is the same or lower in priority than the data already being sent. After the timer expires, the S-GW 616 sends the downlink data notification 632 to the MME 614.

If the small data packet has the same or lower priority with the one already being notified before, there is no need to send the downlink data notification 632 again to MME 614. If the small data packet coming in has a higher priority, the S-GW 616 sends a new downlink data notification 632 with the related priority to MME 614.

The S-GW 616 may enforce DPI (deep packet inspection) to detect whether a packet is small data or not. Alternatively, a traffic detection function (TDF) or the P-GW 618 (with DPI functionality) may report the small data indicator to the S-GW 616 in-band or outband. The in band method may be used to extend the GTP-U header to include this small data indicator. The outband method may be used to define new messages or reuse current GTP-C messages to carry the small data indicator.

When the MME 614 receives the downlink data notification 632 with a small data indicator, the MME 614 will not immediately send a paging request message 636 to eNB, which would forward the paging request 638 to the UE 610, but rather the MME 614 will buffer 634 the notification 632 during the time frame set by the SDDTE optimization timer. If the SDDTE optimization timer on the MME 614 expires, the MME 614 will trigger the service request procedure 640. Downlink data 644 is forwarded from the S-GW 616 to the eNodeB 612, wherein the eNodeB 612 forwards the downlink data 644 to the UE 610. If the S-GW 616 adopts the delaying method for paging, the MME 614 may decide to not enable this feature, and vice versa. The S-GW 616 signals the MME 614 to terminate paging with a stop paging message 642.

Figure 7:
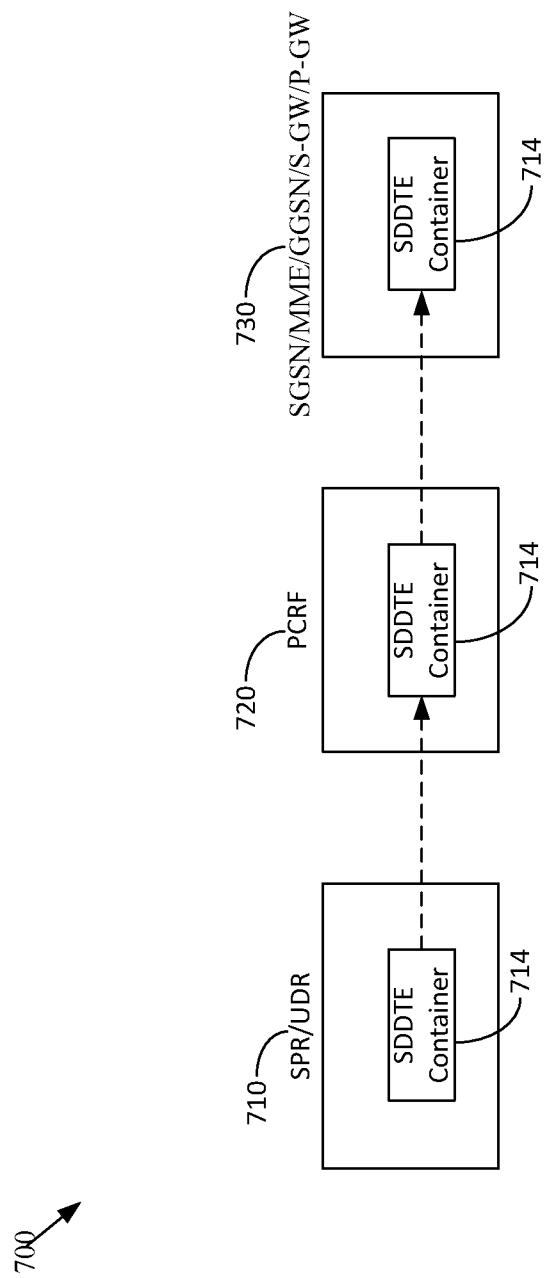
FIG. 7 illustrates an SDDTE optimization process for small data in an evolved packet core (EPC) according to an embodiment.

FIG. 7 illustrates an SDDTE optimization process for small data in an evolved packet core (EPC) 700 according to an embodiment. In FIG. 7, the SDDTE container 714 is part of the subscriber profile and stored in SPR/UDR 710. During an attach procedure, the PCRF 720 obtains the SDDTE container 714 from the SPR/UDR 710 and passes the SDDTE container 714 to SGSN/MME, GGSN/S-GW/P-GW 730 during PDP context creation or EPS session creation procedure. Referring to FIG. 3, the create session request 354, 356, PCEF initiated IP-Can session establishment/modification 357, create session response 358, 359, first downlink data (if not HO) 359, and the create session response 360 may be used for this purpose.

Figure 8:
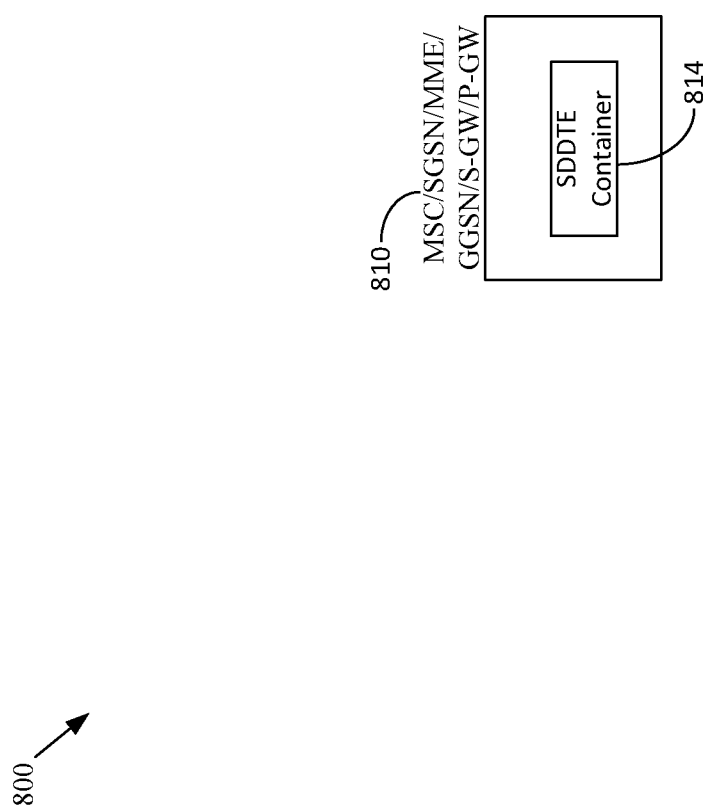
FIG. 8 illustrates an SDDTE optimization process for small data in an evolved packet core (EPC) according to an embodiment.

FIG. 8 illustrates an SDDTE optimization process for small data in an evolved packet core (EPC) 800 according to an embodiment. In FIG. 8, the SDDTE container 814 is configured on device 810, which may be MSC/SGSN/MME, and/or GGSN/S-GW/P-GW, based on operator policy. The SDDTE container 814 may be passed through among them during an attach procedure as described above.

Figure 9:
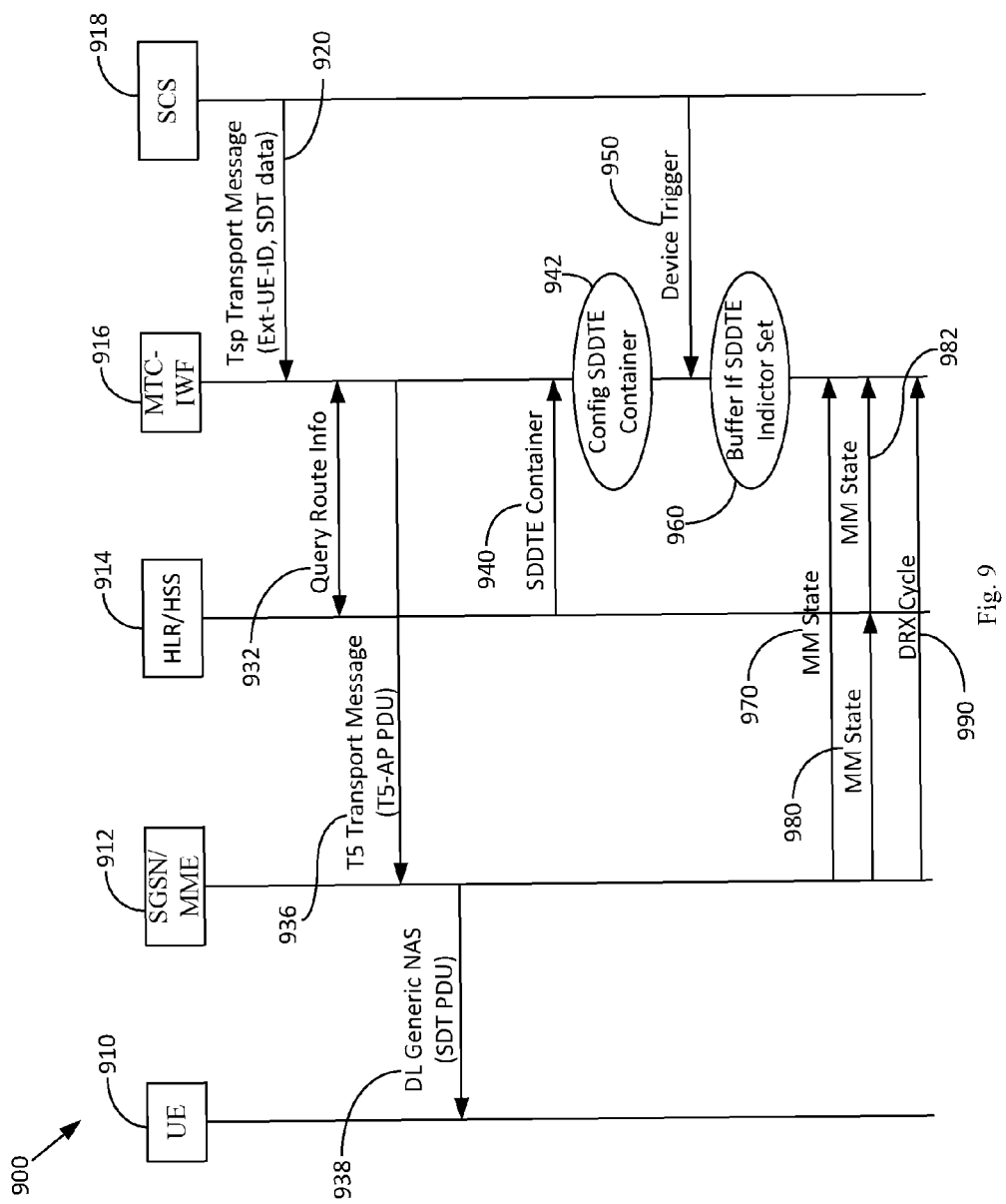
FIG. 9 illustrates a device triggering/downlink small data transmission procedure according to an embodiment.

FIG. 9 illustrates a device triggering/downlink small data transmission procedure 900 according to an embodiment. In FIG. 9, the network includes UE 910, SGSN/MME 912, HLR/HSS 914, MTC-IWF 916 and services capability server (SCS) 918. The SCS 918 provides the MTC-IWF 916 a transport message 920, e.g., ext-UE-ID, SDT data, etc. The MTC-IWF 916 and the HLR/HSS 914 communicate so the MTC-IWF 916 may obtain the query route information 932. The MTC-IWF 916 sends a transport message 936 to the SGSN/MME 912. The SGSN/MME 912 provides a downlink generic NAS 938 to the UE 910.

In FIG. 9, the SDDTE container is configured in the MTC-IWF 916. The MTC-IWF 916 obtains the SDDTE container 940 from the HSS 914 or the SDDTE container 940 is provisioned by the HSS 914 when HSS 914 recognizes that a new UE 910 is online. The MTC-IWF 916 may configure the SDDTE container 942 based on operator policy. In an active/sleep mode operation, the MTC-IWF 916 behaves as usual, i.e., there is no need to gather and buffer device triggers, small data packets. In idle mode operation, for the device triggering case, if the device trigger message 950 arrives at the MTC-IWF 916, the MTC-IWF 916 will check whether the SDDTE optimization indicator is set. If so, the MTC-IWF 916 will buffer messages 960 during the time frame provided by the SDDTE waiting timer. During this period, if more device triggers come in, they will be buffered as well.

In order to behave differently according to the different mobility management (MM) state, the MTC-IWK 916 may obtain the MM state information 970 from the MME 912, HSS 914 or a presence server. In case of getting MM state information from the HSS 914 or the presence server, the HSS 914 and the presence server may retrieve the MM state information 980 from MME 912 via inquiry or subscribe to notification procedure and then provide the MM state information 982 to the MTC-IWF 916. When the MTC-IWK 916 needs to know the DRX cycle length 990, the MTC-IWF 916 may retrieve the DRX cycle length 990 from the MME 912 via inquiry or by subscribing to the notification procedure.

Figure 10:
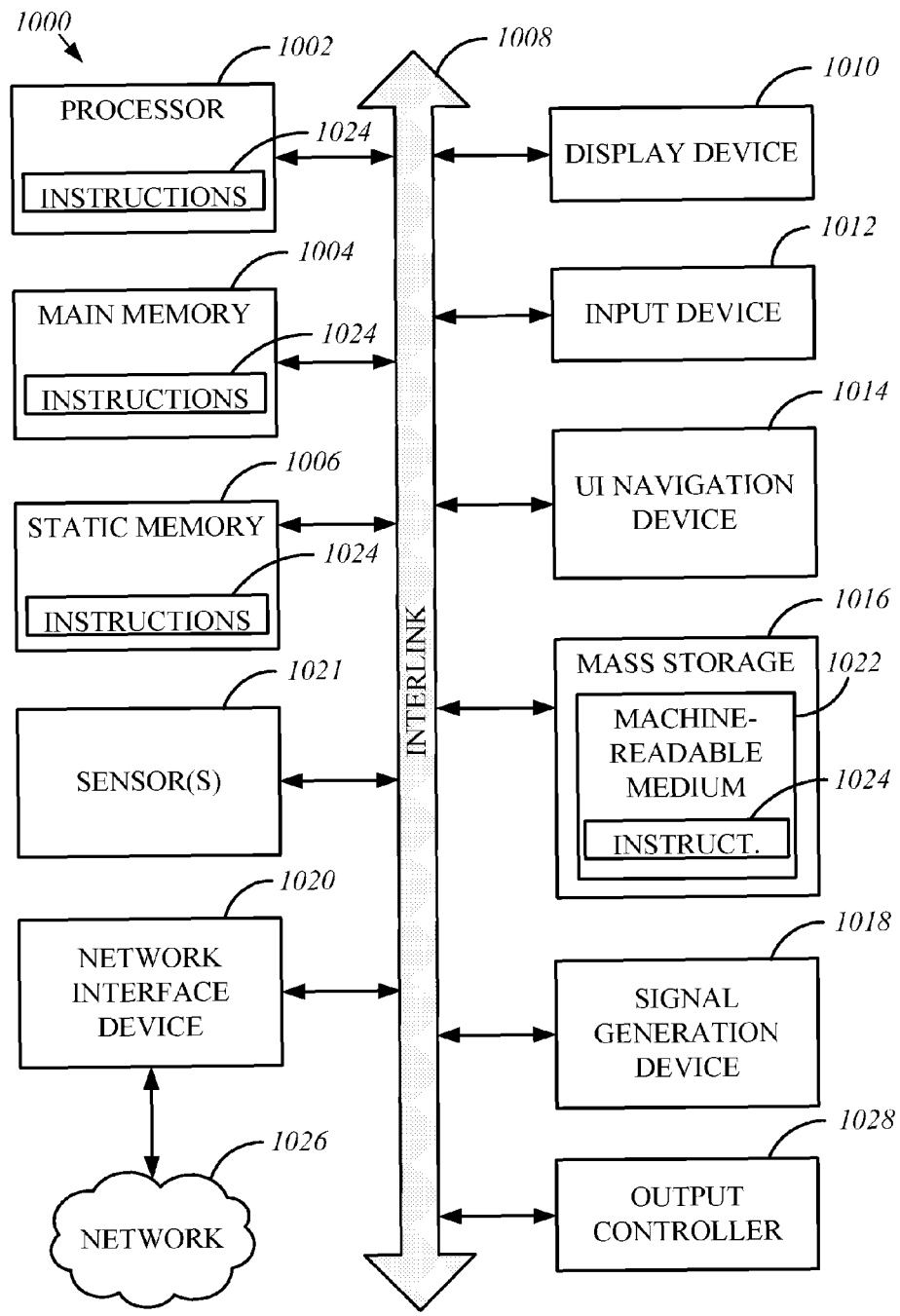
FIG. 10 illustrates a block diagram of an example machine for providing SDDTE optimization for small data in an evolved packet core (EPC) according to an embodiment.

FIG. 10 illustrates a block diagram of an example machine 1000 for providing SDDTE optimization for small data in an evolved packet core (EPC) according to an embodiment upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine and/or a client machine in server-client network environments. In an example, the machine 1000 may act as a peer machine in peer-to-peer (P2P) (or other distributed) network environment. The machine 1000 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, the machine 1000 may be a network element or device such as a HSS, an SPR, a UDR, an MSC, an SGSN, an MME, a GGSN, an S-GW, a P-GW, an MTC-IWF, a PRCP, or any other type of network element that may be coupled to a user equipment, mobile station, mobile phone or like device. Still further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 1002 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 1002 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multi-processor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, at least some of which may communicate with others via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR)) connection to communicate or control one or more peripheral devices (e.g., a printer, card reader, etc.).

The storage device 1016 may include at least one machine readable medium 1022 on which is stored one or more sets of data structures or instructions 1024 (e.g., software) embodying or utilized by any one or more of the techniques or functions described herein. The instructions 1024 may also reside, at least partially, additional machine readable memories such as main memory 1004, static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) that configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Additional Notes & in Examples:

Example 1 includes subject matter (such as a device, apparatus, client or system) for a serving node, including memory for storing an SDDTE optimization container therein and a processor, coupled to the memory, the processor arranged to analyze the SDDTE optimization container including parameters provided therein and to perform SDDTE optimization based on the parameters.

Example 2 may optionally include the subject matter of Example 1 including wherein the parameters provided by the SDDTE optimization container include an SDDTE optimization timer, wherein the processor holds in the memory small data messages received during a time frame set by the SDDTE optimization timer upon receipt of a first small data message.

In Example 3 the subject matter of any one or more of Examples 1-2 may optionally include, wherein the processor forwards the SDDTE optimization container to an enforcing network device, wherein the enforcing network device buffers small data during a time frame set by an SDDTE optimization timer provided by the parameters of the SDDTE optimization container.

In Example 4 the subject matter of any one or more of Examples 1-3 may optionally include, wherein the processor is arranged to provide a PCRF function during an attach procedure for a user equipment and upon receipt of the SDDTE optimization container provisions the SDDTE optimization container to an enforcing network device for therein buffering small data.

In Example 5 the subject matter of any one or more of Examples 1-4 may optionally include, wherein the processor is arranged to function as one selected from a group consisting of a home subscriber server, a user data repository and a subscriber profile repository.

In Example 6 the subject matter of any one or more of Examples 1-5 may optionally include, wherein the processor is arranged to function as a home subscriber server (HSS), wherein the HSS, during an attach procedure, provisions the SDDTE optimization container to an enforcing network device.

In Example 7 the subject matter of any one or more of Examples 1-6 may optionally include, wherein the processor is arranged to function as one selected from a group consisting of a mobile switching center (MSC), serving general packet radio service (GPRS) support node (SGSN), a mobility management entity (MME), a serving general packet radio service (GPRS) support node (SGSN), a serving gateway (S-GW), a packet data network gateway (P-GW) and a machine-type communication interworking function (MTC-IWF).

In Example 8 the subject matter of any one or more of Examples 1-7 may optionally include, wherein the small data comprises at least one selected from a group consisting of device trigger messages, small data messages and downlink data notifications for a time period set by the SDDTE optimization timer upon detection of receipt of a device trigger or small data packet, and wherein the SDDTE optimization container comprises a SDDTE optimization indicator for indicating to an enforcing network device to buffer device triggers, downlink data notification or small data, a SDDTE waiting time for buffering device triggers, small data or paging notifications, a small data indicator to indicate small data packets and a SDDTE waiting timer to buffer incoming device triggers, small data or small data notifications for a predetermined duration.

In Example 9 the subject matter of any one or more of Examples 1-8 may optionally include, wherein the predetermined duration is set to a discontinuous reception (DRX) cycle length or the SDDTE waiting time.

In Example 10 may include subject matter (such as a method or means for performing acts) including receiving, at a network device, an SDDTE optimization container including parameters for controlling routing of small data in a network, analyzing the parameters in the SDDTE optimization container for controlling routing of small data in a network and performing SDDTE optimization based on the parameters for controlling routing of small data in a network.

Example 11 may optionally include the subject matter of Example 10 including receiving small data messages, upon receiving the small data messages, determining a time frame for holding the received small data messages according to an SDDTE optimization timer obtained from the SDDTE optimization container and storing the small data messages in memory for the time frame.

In Example 12 the subject matter of any one or more of Examples 10-11 may optionally include wherein the performing SDDTE optimization further comprises forwarding the SDDTE optimization container to an enforcing network device and buffering small data at the enforcing network device during a time frame set by an SDDTE optimization timer provided by the parameters of the SDDTE optimization container.

In Example 13 the subject matter of any one or more of Examples 10-12 may optionally include further comprising providing a PCRF function during an attach procedure for a user equipment, wherein the performing SDDTE optimization further comprises providing the SDDTE optimization container to an enforcing network device for buffering small data upon receipt of the SDDTE optimization container.

In Example 14 the subject matter of any one or more of Examples 10-13 may optionally include wherein the receiving, at a network device, an SDDTE optimization container further comprises receiving the SDDTE optimization container at one selected from a group consisting of a home subscriber server, a user data repository and a subscriber profile repository.

In Example 15 the subject matter of any one or more of Examples 10-14 may optionally include wherein the receiving, at a network device, an SDDTE optimization container further comprises receiving the SDDTE optimization container at a home subscriber server (HSS), wherein the HSS, during an attach procedure, provisions the SDDTE optimization container to an enforcing network device.

In Example 16 the subject matter of any one or more of Examples 10-15 may optionally include wherein the receiving, at a network device, an SDDTE optimization container further comprises receiving the SDDTE optimization container at one selected from a group consisting of a mobile switching center (MSC), serving general packet radio service (GPRS) support node (SGSN), a mobility management entity (MME), a serving general packet radio service (GPRS) support node (SGSN), a serving gateway (S-GW), a packet data network gateway (P-GW) and a machine-type communication interworking function (MTC-IWF).

In Example 17 the subject matter of any one or more of Examples 10-16 may optionally include wherein the analyzing the parameters in the SDDTE optimization container for controlling routing of small data in a network further comprises analyzing the parameters in the SDDTE optimization container for controlling routing of at least one selected from a group consisting of device trigger messages, small data messages and downlink data notifications for a time period set by an SDDTE optimization timer upon detection of receipt of a device trigger or small data packet, and wherein the receiving the SDDTE optimization container further comprises receiving a SDDTE optimization indicator for indicating to an enforcing network device to buffer device triggers, downlink data notification or small data, an SDDTE waiting time for buffering device triggers, small data or paging notifications, a small data indicator to indicate small data packets and an SDDTE waiting timer to buffer incoming device triggers, small data or small data notifications for a predetermined duration.

In Example 18 the subject matter of any one or more of Examples 10-17 may optionally include further comprising setting the predetermined duration to a discontinuous reception (DRX) cycle length or the SDDTE waiting time.

Example 19 includes subject matter (such as a device, apparatus, client or system) including a first network element, arranged to store a SDDTE optimization container, the SDDTE optimization container including parameters for SDDTE optimization and a second network element, coupled to the first network element, arranged to receive the SDDTE optimization container from the first network element, wherein the second network element, upon receipt of the SDDTE optimization container from the first network element, implements SDDTE optimization based on the parameters for SDDTE optimization from the SDDTE optimization container.

Example 20 may optionally include the subject matter of Example 19 including wherein the second network element implements the SDDTE optimization by forwarding the SDDTE optimization container to an enforcing network device, wherein the enforcing network device buffers small data during a time frame set by an SDDTE optimization timer provided by the SDDTE optimization container.

In Example 21 the subject matter of any one or more of Examples 19-20 may optionally include wherein the second network element implements SDDTE optimization by buffering small data during a time frame set by an SDDTE optimization timer provided by the SDDTE optimization container.

In Example 22 the subject matter of any one or more of Examples 19-21 may optionally include wherein the second network element comprises a policy and charging rules function (PCRF), the PCRF, during an attach procedure and upon receipt of the SDDTE optimization container from the first network element, provisions the SDDTE optimization container to an enforcing network device.

In Example 23 the subject matter of any one or more of Examples 19-22 may optionally include wherein the second network element comprises one selected from a group consisting of a subscriber profile repository and a user data repository.

In Example 24 the subject matter of any one or more of Examples 19-23 may optionally include wherein the first network element comprises one selected from the group consisting of a home subscriber server (HSS), user data repository (UDR) and subscriber profile repository (SPR).

In Example 25 the subject matter of any one or more of Examples 19-24 may optionally include wherein the second network element comprises a home subscriber server (HSS), wherein the HSS, during an attach procedure, provisions the SDDTE optimization container to an enforcing network device.

In Example 26 the subject matter of any one or more of Examples 19-25 may optionally include wherein the enforcing network device includes at least one selected from the group consisting of GGSN, a mobile switching center (MSC), serving general packet radio service (GPRS) support node (SGSN), a mobility management entity (MME), a serving general packet radio service (GPRS) support node (SGSN), gateway GPRS support node (GGSN), a serving gateway (S-GW), a packet data network gateway (P-GW) and a machine-type communication interworking function (MTC-IWF).

In Example 27 the subject matter of any one or more of Examples 19-26 may optionally include wherein the SDDTE optimization container comprises a SDDTE optimization indicator for indicating to an enforcing network device to buffer device triggers, downlink data notification or small data, an SDDTE waiting time for buffering device triggers, small data or paging notifications, a small data indicator to indicate small data packets and an SDDTE waiting timer to buffer incoming device triggers, small data or small data notifications for a predetermined duration.

Example 28 may include subject matter (such as means for performing acts or machine readable medium including instructions that, when executed by the machine, cause the machine to perform acts) including receiving, at a network device, an SDDTE optimization container including parameters for controlling routing of small data in a network, analyzing the parameters in the SDDTE optimization container for controlling routing of small data in a network and performing SDDTE optimization based on the parameters for controlling routing of small data in a network.

Example 29 may optionally include the subject matter of Example 28 including receiving small data messages, upon receiving the small data messages, determining a time frame for holding the received small data messages according to an SDDTE optimization timer obtained from the SDDTE optimization container and storing the small data messages in memory for the time frame.

In Example 30 the subject matter of any one or more of Examples 28-29 may optionally include wherein the performing SDDTE optimization further comprises forwarding the SDDTE optimization container to an enforcing network device and buffering small data at the enforcing network device during a time frame set by an SDDTE optimization timer provided by the parameters of the SDDTE optimization container.

In Example 31 the subject matter of any one or more of Examples 28-30 may optionally include further comprising providing a PCRF function during an attach procedure for a user equipment, wherein the performing SDDTE optimization further comprises providing the SDDTE optimization container to an enforcing network device for buffering small data upon receipt of the SDDTE optimization container.

In Example 32 the subject matter of any one or more of Examples 28-31 may optionally include wherein the receiving, at a network device, an SDDTE optimization container further comprises receiving the SDDTE optimization container at one selected from a group consisting of a home subscriber server, a user data repository and a subscriber profile repository.

In Example 33 the subject matter of any one or more of Examples 28-32 may optionally include wherein the receiving, at a network device, an SDDTE optimization container further comprises receiving the SDDTE optimization container at a home subscriber server (HSS), wherein the HSS, during an attach procedure, provisions the SDDTE optimization container to an enforcing network device.

In Example 34 the subject matter of any one or more of Examples 28-33 may optionally include wherein the receiving, at a network device, an SDDTE optimization container further comprises receiving the SDDTE optimization container at one selected from a group consisting of a mobile switching center (MSC), serving general packet radio service (GPRS) support node (SGSN), a mobility management entity (MME), a serving general packet radio service (GPRS) support node (SGSN), a serving gateway (S-GW), a packet data network gateway (P-GW) and a machine-type communication interworking function (MTC-IWF).

In Example 35 the subject matter of any one or more of Examples 28-34 may optionally include wherein the analyzing the parameters in the SDDTE optimization container for controlling routing of small data in a network further comprises analyzing the parameters in the SDDTE optimization container for controlling routing of at least one selected from a group consisting of device trigger messages, small data messages and downlink data notifications for a time period set by an SDDTE optimization timer upon detection of receipt of a device trigger or small data packet, and wherein the receiving the SDDTE optimization container further comprises receiving a SDDTE optimization indicator for indicating to an enforcing network device to buffer device triggers, downlink data notification or small data, an SDDTE waiting time for buffering device triggers, small data or paging notifications, a small data indicator to indicate small data packets and an SDDTE waiting timer to buffer incoming device triggers, small data or small data notifications for a predetermined duration.

In Example 36 the subject matter of any one or more of Examples 28-35 may optionally include further comprising setting the predetermined duration to a discontinuous reception (DRX) cycle length or the SDDTE waiting time.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A network device included in an evolved packet core (EPC) for providing small data and device triggering enhancement (SDDTE), comprising:
   memory for storing an SDDTE optimization container therein; and
   a processor, coupled to the memory, the processor arranged to analyze the SDDTE optimization container including parameters provided therein and to perform SDDTE optimization based on the parameters, wherein the parameters include an SDDTE optimization timer to set a time frame for small data to be held in the memory prior to transmission to a user equipment (UE), the processor to hold, in the memory, small data messages received during the time frame set by the SDDTE optimization timer upon receipt of a first small data message.

2. The network device of claim 1, wherein the processor forwards the SDDTE optimization container to an enforcing network device, wherein the enforcing network device buffers small data during the time frame set by the SDDTE optimization timer provided by the parameters of the SDDTE optimization container.

3. The network device of claim 1, wherein the processor is arranged to provide a Policy and Charging Rules Function (PCRF) function during an attach procedure for the UE and upon receipt of the SDDTE optimization container provisions the SDDTE optimization container to an enforcing network device for therein buffering small data.

4. The network device of claim 1, wherein the processor is arranged to function as one selected from a group consisting of a home subscriber server (HSS), a user data repository and a subscriber profile repository.

5. The network device of claim 1, wherein the processor is arranged to function as a home subscriber server (HSS), wherein the HSS, during an attach procedure, provisions the SDDTE optimization container to an enforcing network device.

6. The network device of claim 5, wherein the processor is arranged to function as one selected from a group consisting of a mobile switching center (MSC), serving general packet radio service (GPRS) support node (SGSN), a mobility management entity (MME), a serving general packet radio service (GPRS) support node (SGSN), a serving gateway (S-GW), a packet data network gateway (P-GW) and a machine-type communication interworking function (MTC-IWF).

7. The network device of claim 1, wherein the small data comprises at least one selected from a group consisting of device trigger messages, small data messages and downlink data notifications for a time period set by an SDDTE optimization timer upon detection of receipt of a device trigger or small data packet, and wherein the SDDTE optimization container comprises a SDDTE optimization indicator for indicating to an enforcing network device to buffer device triggers, downlink data notification or small data, an SDDTE waiting time for buffering device triggers, small data or paging notifications, a small data indicator to indicate small data packets and an SDDTE waiting timer to buffer incoming device triggers, small data or small data notifications for a predetermined duration.

8. The network device of claim 7, wherein the predetermined duration is set to a discontinuous reception (DRX) cycle length or the SDDTE waiting time.

9. A method for providing small data and device triggering enhancement (SDDTE), comprising:
receiving, at a network device included in an evolved packet core (EPC), an SDDTE optimization container including parameters for controlling routing of small data in a network, wherein the parameters include an SDDTE optimization timer to set a time frame for small data to be held in a memory of the network device prior to transmission to a user equipment (UE);
analyzing the parameters in the SDDTE optimization container for controlling routing of small data in a network;
performing SDDTE optimization based on the parameters for controlling routing of small data in a network; and holding, in the memory of the network device, small data messages received during the time frame set by the SDDTE optimization timer upon receipt of a first small data message.

10. The method of claim 9, wherein the performing SDDTE optimization further comprises:
forwarding the SDDTE optimization container to an enforcing network device; and
buffering small data at the enforcing network device during the time frame set by the SDDTE optimization timer provided by the parameters of the SDDTE optimization container.

11. The method of claim 9 further comprising providing a PCRF function during an attach procedure for the user equipment, wherein the performing SDDTE optimization further comprises providing the SDDTE optimization container to an enforcing network device for buffering small data upon receipt of the SDDTE optimization container.

12. The method of claim 9, wherein the receiving, at a network device, an SDDTE optimization container further comprises receiving the SDDTE optimization container at one selected from a group consisting of a home subscriber server (HSS), a user data repository and a subscriber profile repository.

13. The method of claim 9, wherein the receiving, at a network device, an SDDTE optimization container further comprises receiving the SDDTE optimization container at a home subscriber server (HSS), wherein the HSS, during an attach procedure, provisions the SDDTE optimization container to an enforcing network device.

14. The method of claim 13, wherein the receiving, at a network device, an SDDTE optimization container further comprises receiving the SDDTE optimization container at one selected from a group consisting of a mobile switching center (MSC), serving general packet radio service (GPRS) support node (SGSN), a mobility management entity (MME), a serving general packet radio service (GPRS) support node (SGSN), a serving gateway (S-GW), a packet data network gateway (P-GW) and a machine-type communication interworking function (MTC-IWF).

15. The method of claim 9, wherein the analyzing the parameters in the SDDTE optimization container for controlling routing of small data in a network further comprises analyzing the parameters in the SDDTE optimization container for controlling routing of at least one selected from a group consisting of device trigger messages, small data messages and downlink data notifications for a time period set by an SDDTE optimization timer upon detection of receipt of a device trigger or small data packet, and wherein the receiving the SDDTE optimization container further comprises receiving a SDDTE optimization indicator for indicating to an enforcing network device to buffer device triggers, downlink data notification or small data, an SDDTE waiting time for buffering device triggers, small data or paging notifications, a small data indicator to indicate small data packets and an SDDTE waiting timer to buffer incoming device triggers, small data or small data notifications for a predetermined duration.

16. The method of claim 15 further comprising setting the predetermined duration to a discontinuous reception (DRX) cycle length or the SDDTE waiting time.

17. A system optimized for small data and device triggering enhancement (SDDTE), comprising:
a first network processor comprising a memory and included in an evolved packet core (EPC), arranged to store a SDDTE optimization container, the SDDTE optimization container including parameters for SDDTE optimization; and a second network processor comprising a memory and included in the EPC, coupled to the first network processor, arranged to receive the SDDTE optimization container from the first network processor, wherein the second network processor, upon receipt of the SDDTE optimization container from the first network processor, implements SDDTE optimization based on the parameters for SDDTE optimization from the SDDTE optimization container, wherein the parameters include an SDDTE optimization timer to set a time frame for small data to be held in the memory of the second network processor prior to transmission to a user equipment (UE), the second network processor configured to hold small data messages received during a time frame set by the SDDTE optimization timer in the memory of the second network processor upon receipt of a first small data message.

18. The system of claim 17, wherein the second network processor implements the SDDTE optimization by forwarding the SDDTE optimization container to an enforcing network device, wherein the enforcing network device buffers small data during the time frame set by an SDDTE optimization timer provided by the SDDTE optimization container.

19. The system of claim 17, wherein the second network processor comprises a policy and charging rules function (PCRF), the PCRF, during an attach procedure and upon receipt of the SDDTE optimization container from the first network processor, provisions the SDDTE optimization container to an enforcing network device.

20. The system of claim 19, wherein the second network processor comprises one selected from a group consisting of a subscriber profile repository and a user data repository.

21. The system of claim 17, wherein the first network processor comprises one selected from the group consisting of a home subscriber server (HSS), user data repository (UDR) and subscriber profile repository (SPR).

22. The system of claim 17, wherein the second network processor comprises a home subscriber server (HSS), wherein the HSS, during an attach procedure, provisions the SDDTE optimization container to an enforcing network device.

* * * * *